April 16, 1935.    R. N. PIERSON ET AL    1,998,287

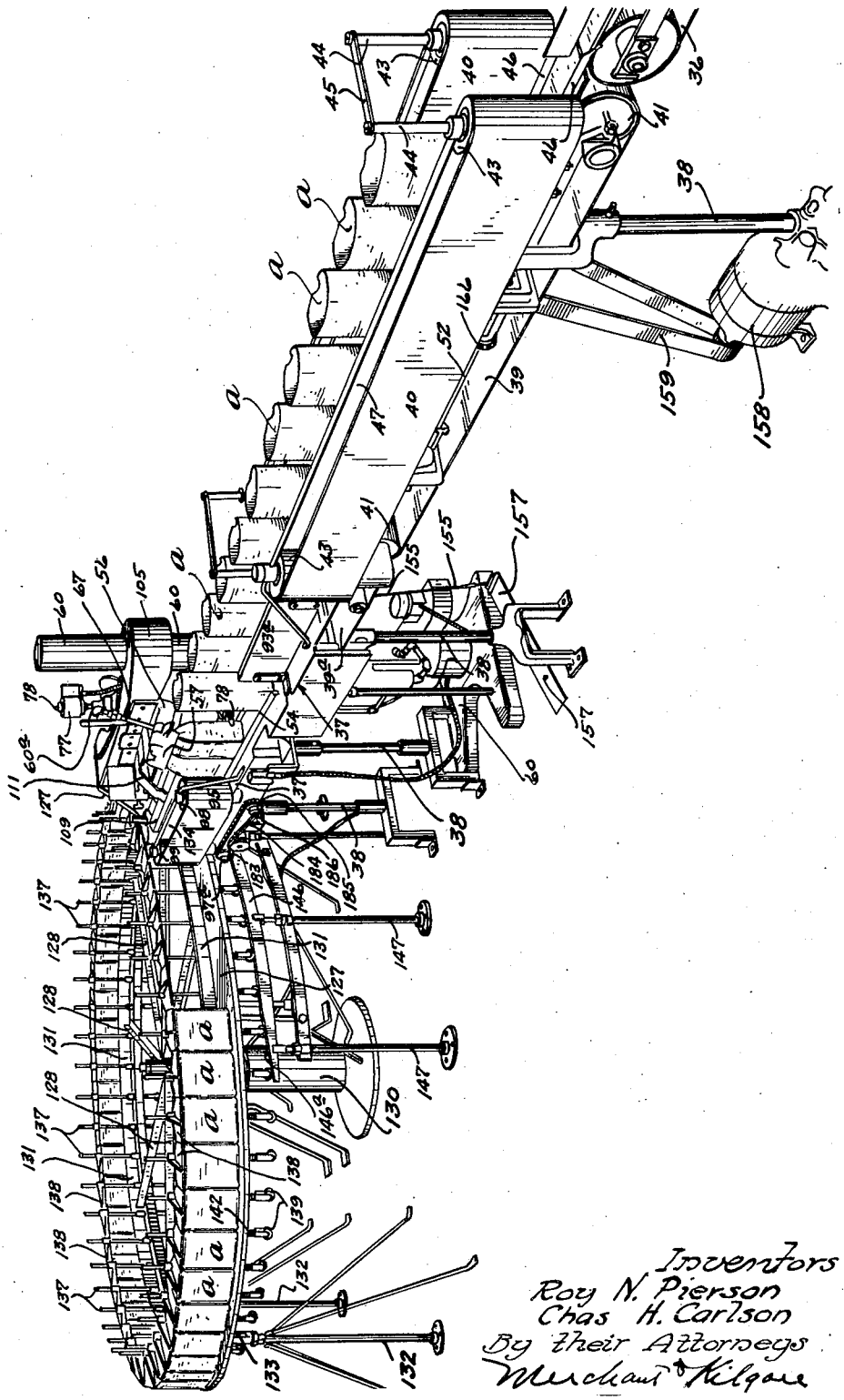

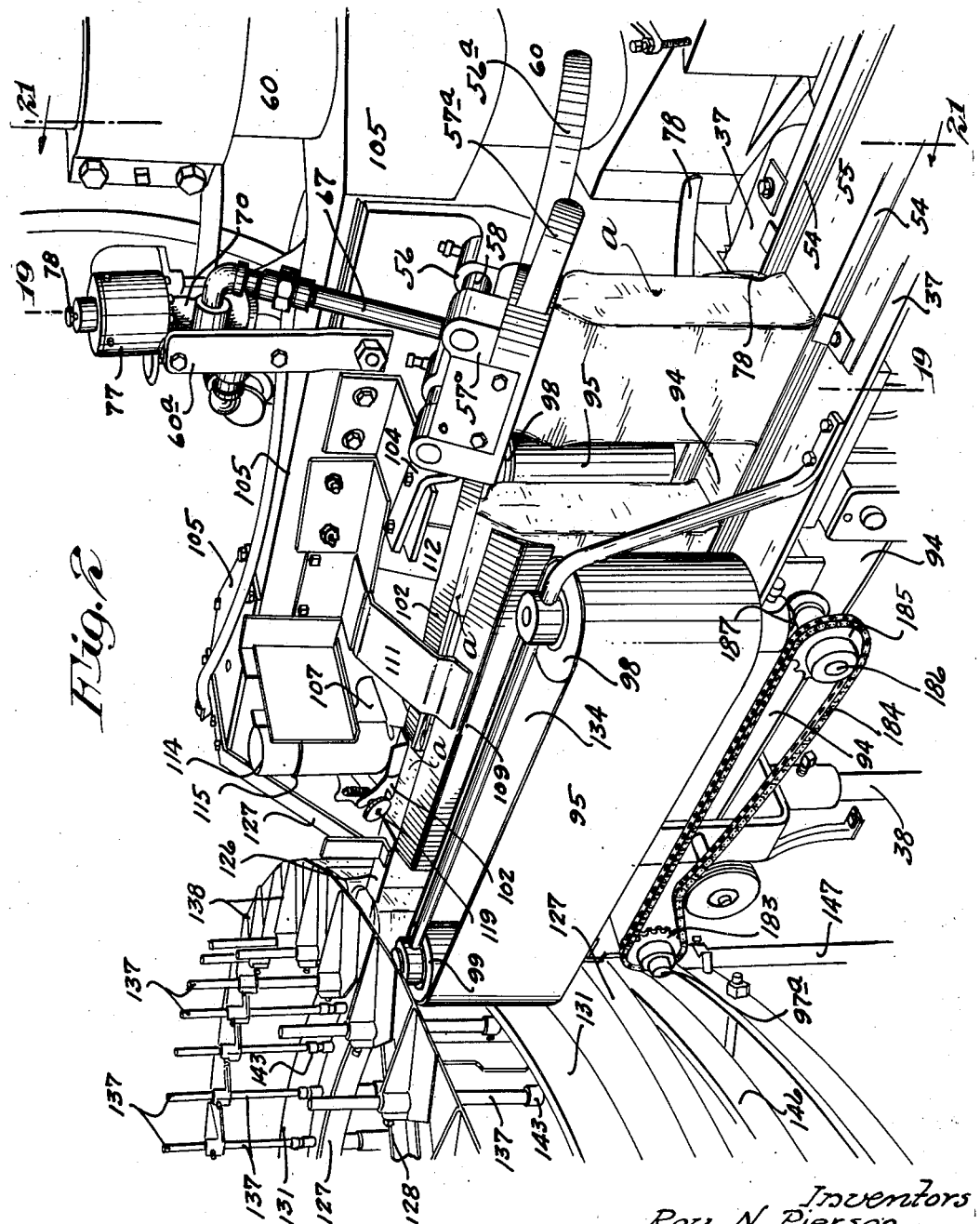

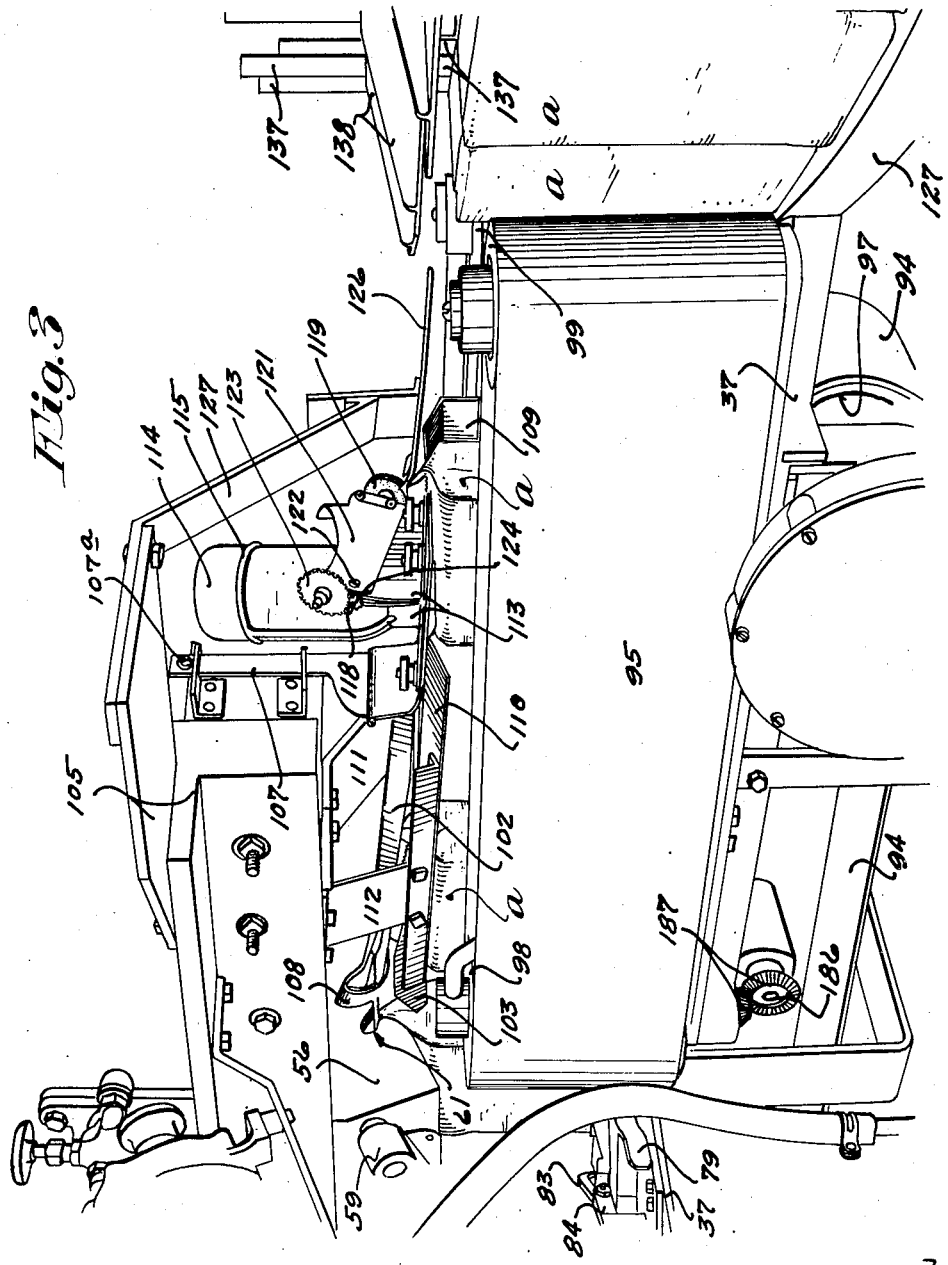

BAG SEALING MACHINE

Filed Jan. 27, 1933    12 Sheets-Sheet 4

Inventors
Roy N. Pierson
Chas H. Carlson
By their Attorneys

April 16, 1935.  R. N. PIERSON ET AL  1,998,287
BAG SEALING MACHINE
Filed Jan. 27, 1933    12 Sheets-Sheet 5
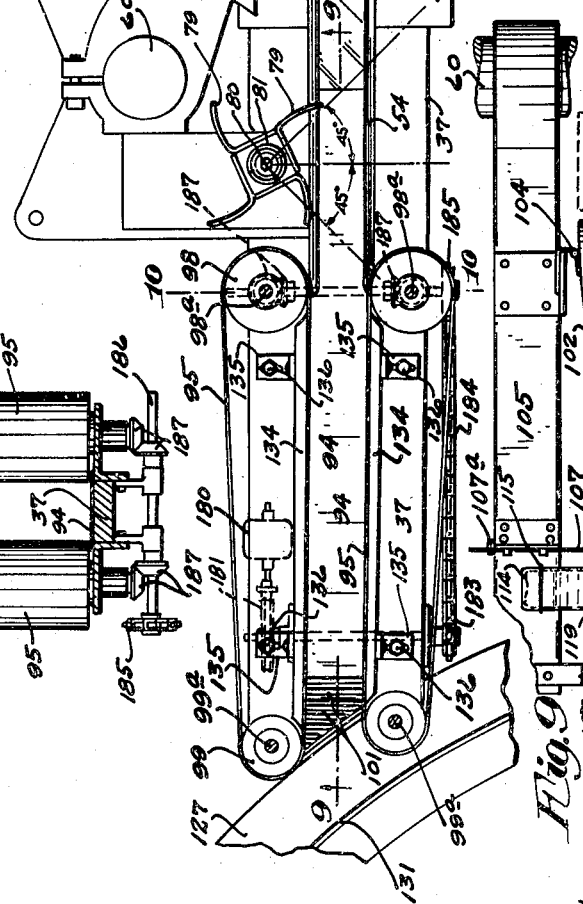
Inventors
Roy N. Pierson
Chas. H. Carlson
By their Attorneys

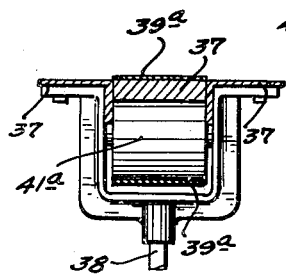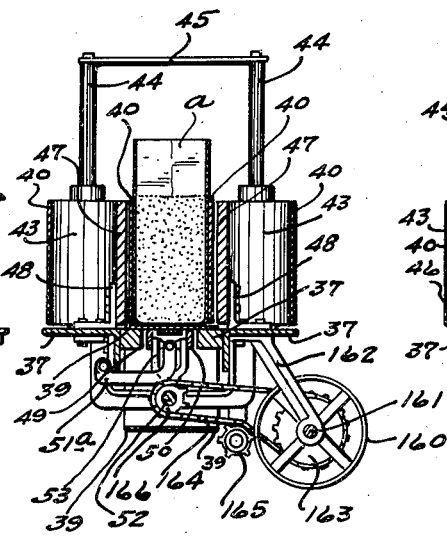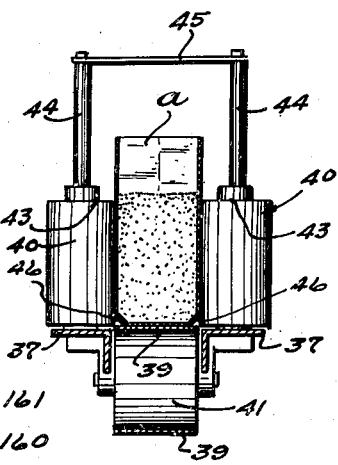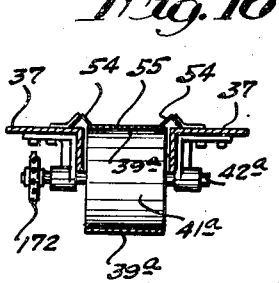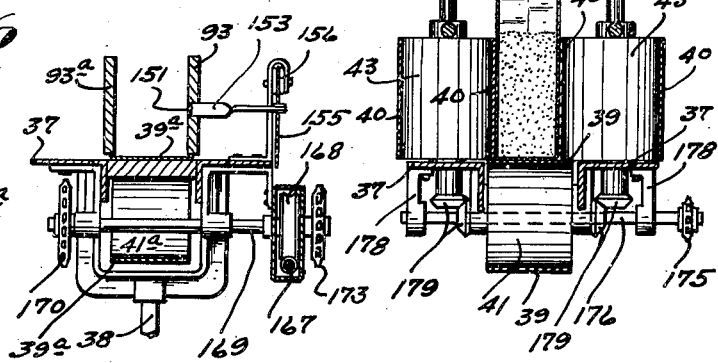

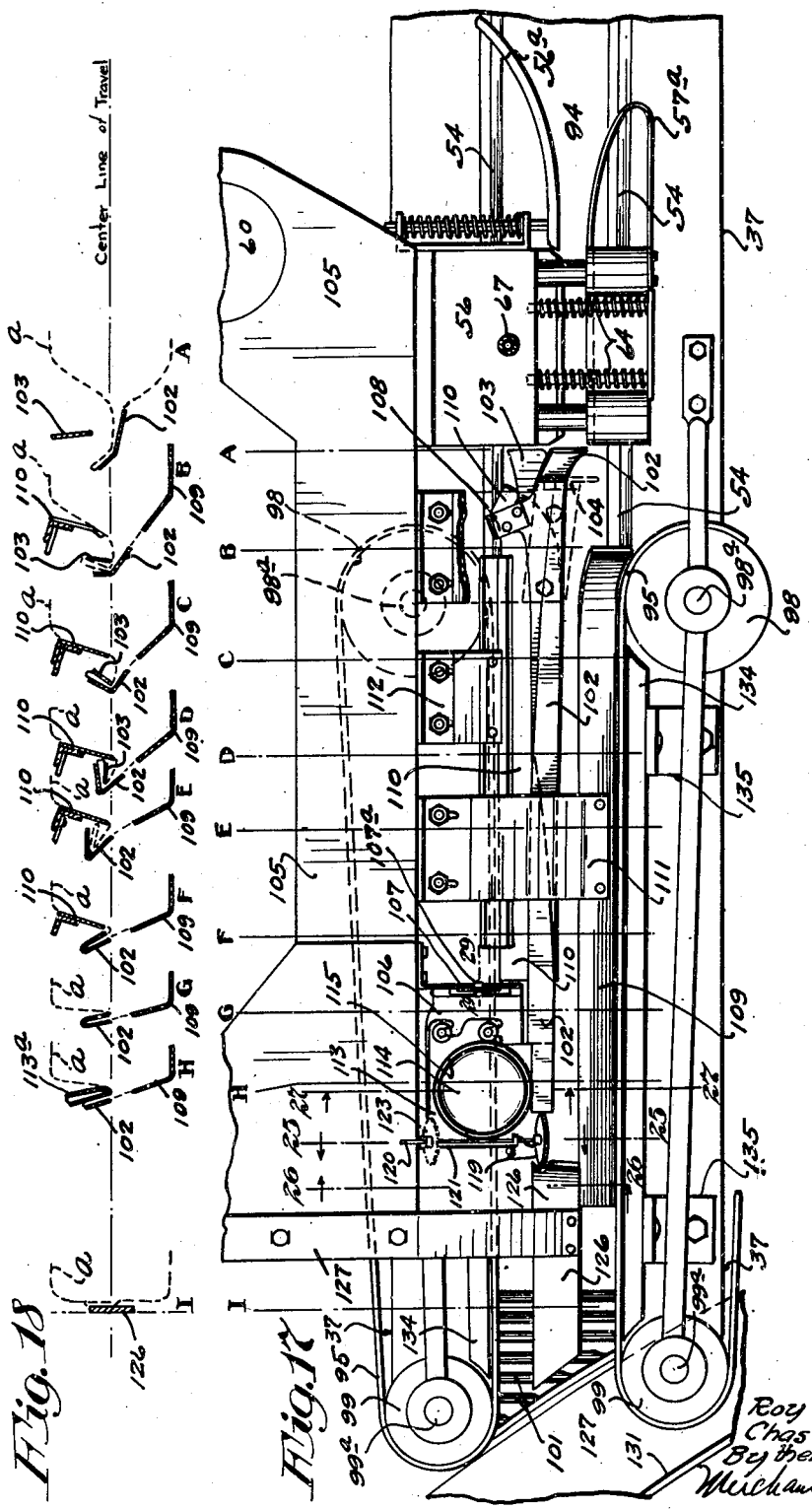

April 16, 1935.    R. N. PIERSON ET AL    1,998,287
BAG SEALING MACHINE
Filed Jan. 27, 1933     12 Sheets-Sheet 8
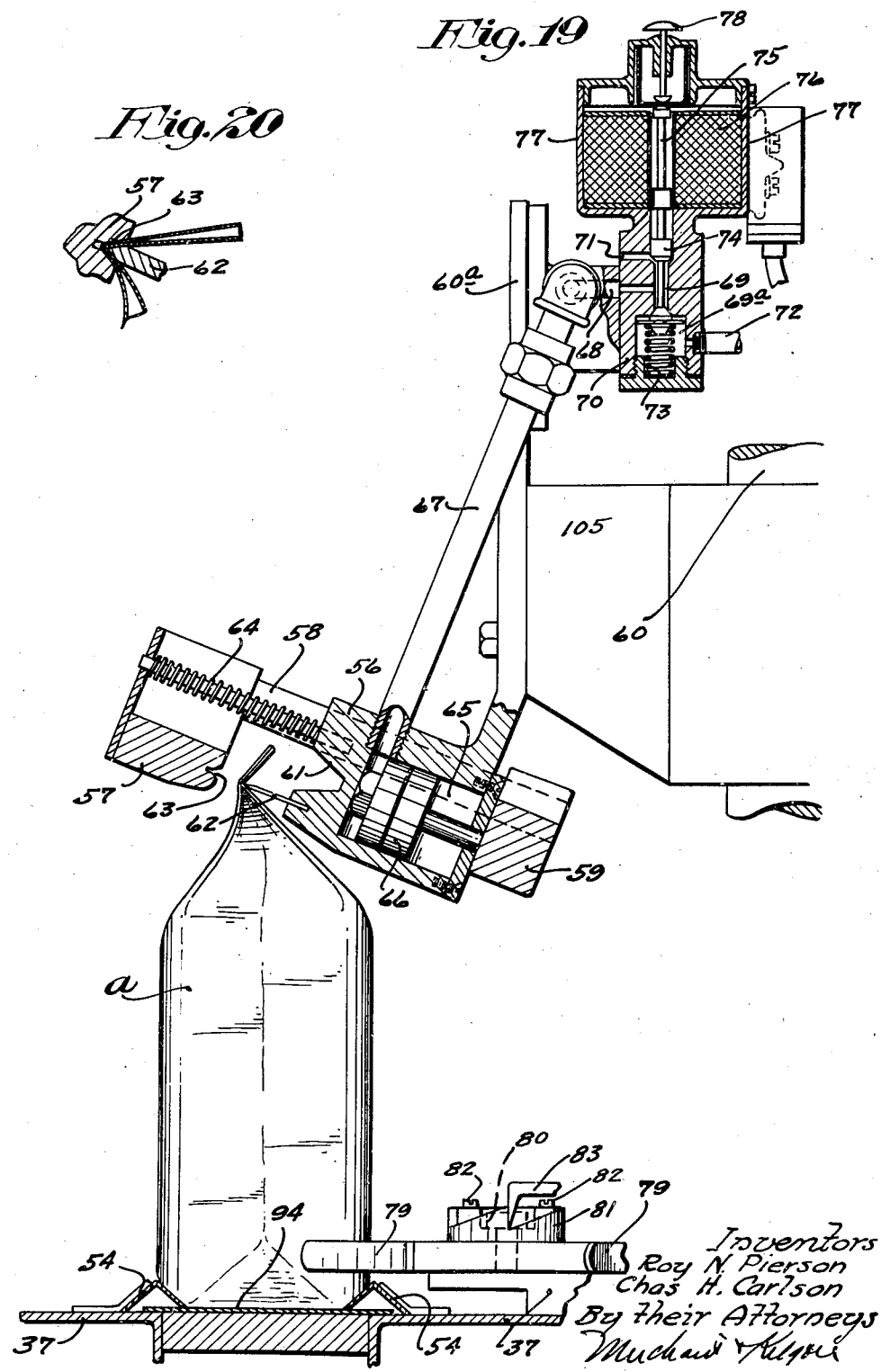

April 16, 1935.   R. N. PIERSON ET AL   1,998,287
BAG SEALING MACHINE
Filed Jan. 27, 1933   12 Sheets-Sheet 9
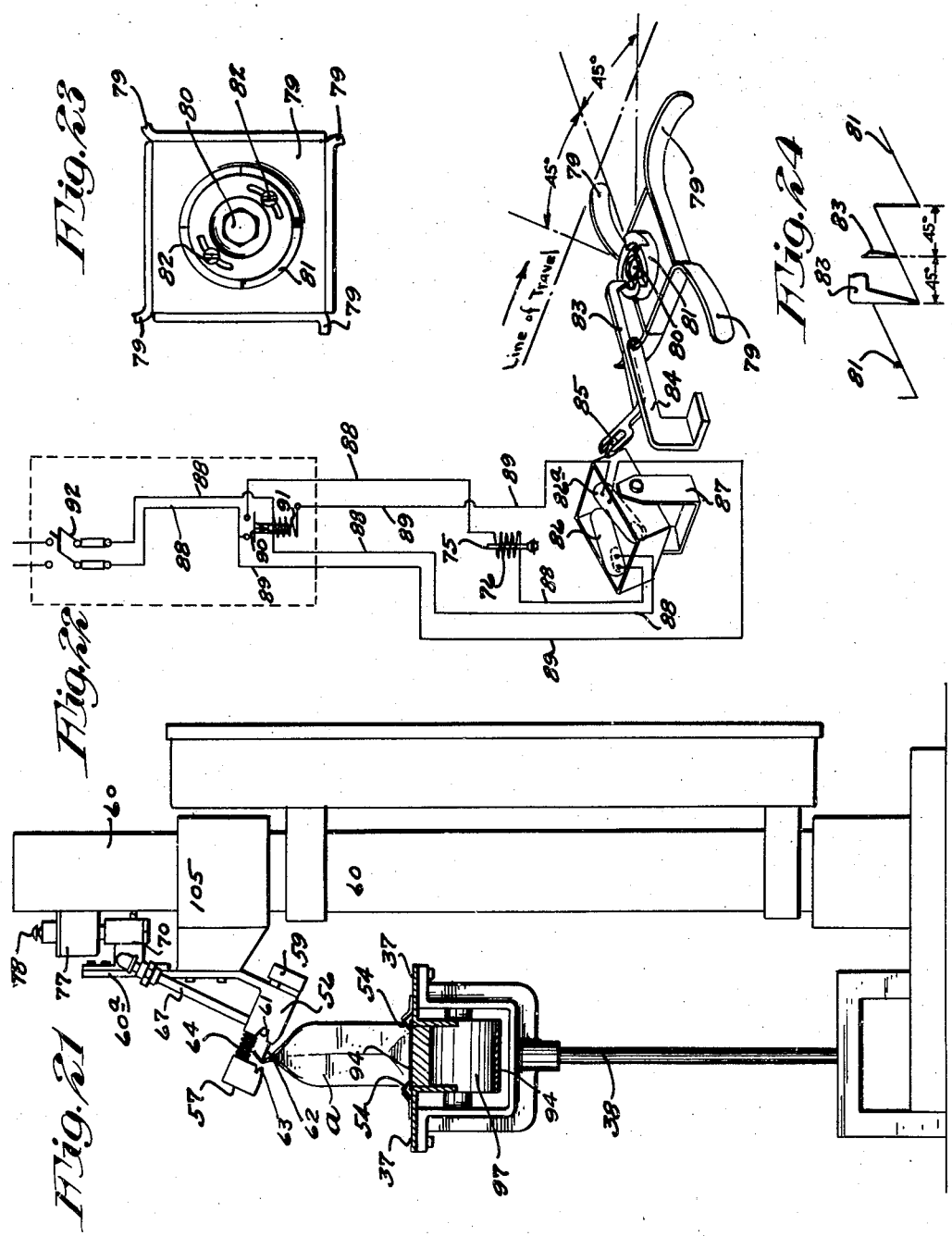
Inventors
Roy N. Pierson
Chas. H. Carlson
By their Attorneys

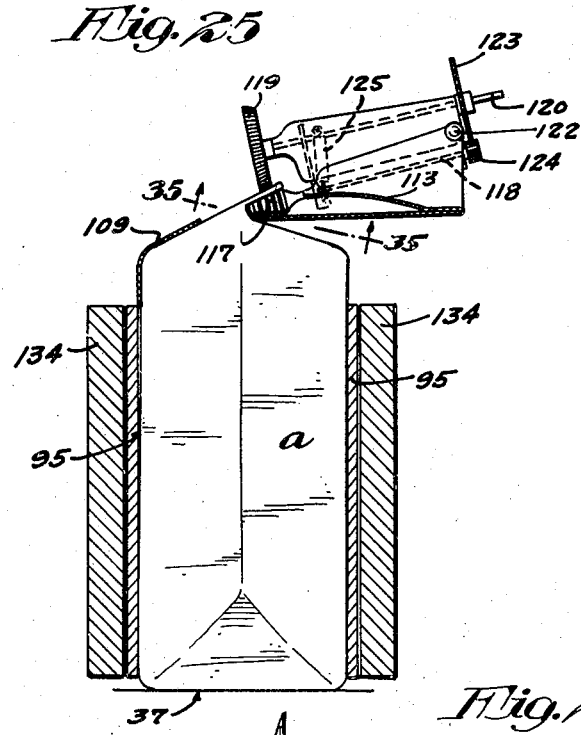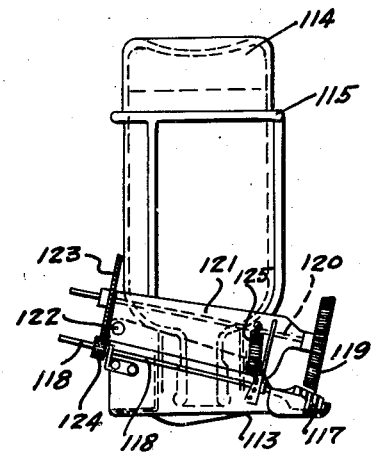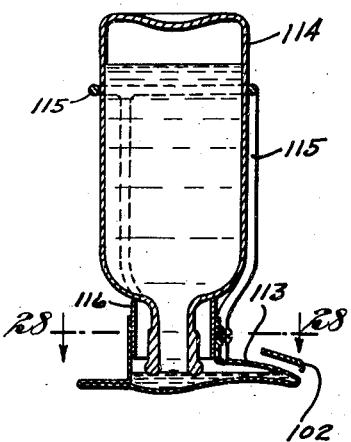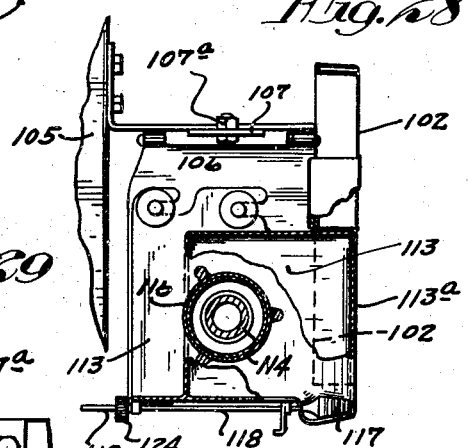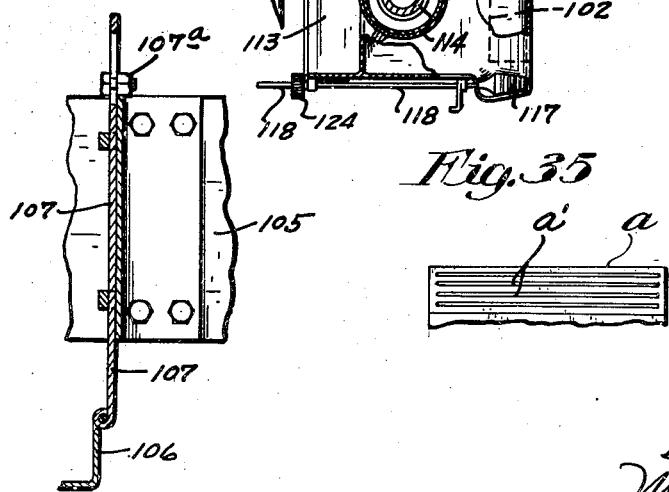

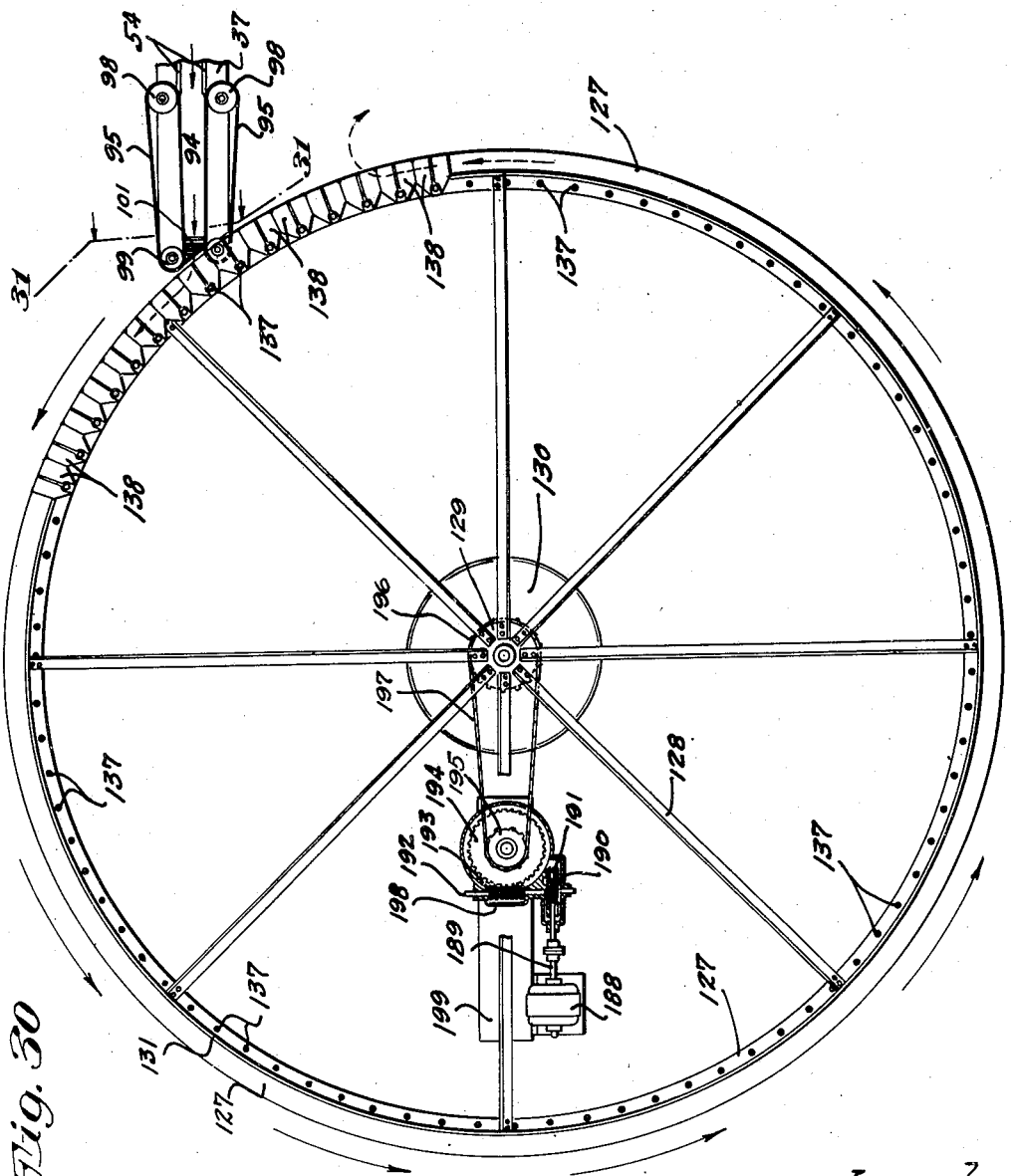

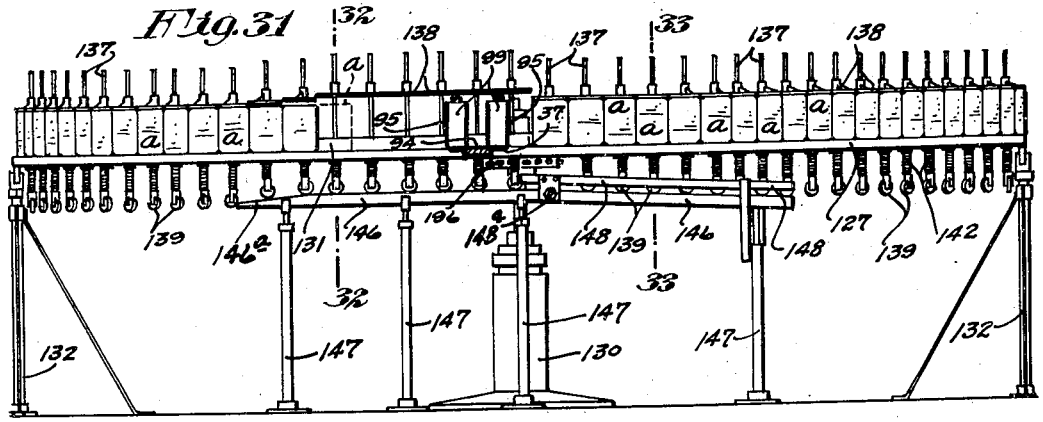
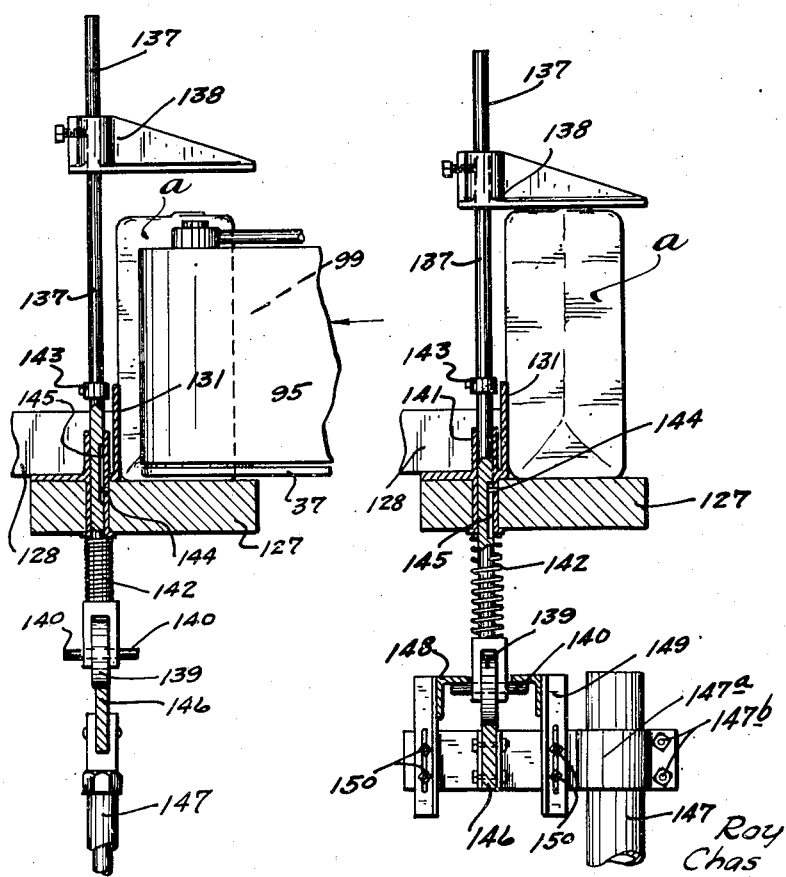

Patented Apr. 16, 1935

1,998,287

UNITED STATES PATENT OFFICE 1,998,287

BAG SEALING MACHINE

Roy N. Pierson and Charles H. Carlson, Minneapolis, Minn., assignors to Russell-Miller Milling Company, Minneapolis, Minn., a corporation of North Dakota Application January 27, 1933, Serial No. 653,792

42 Claims. (Cl. 93—6)

Our invention provides a highly efficient machine which, in its complete form, is adapted to receive paper sacks filled with flour or other material, properly form and pack the filled sacks, crimp, fold and seal the unfilled tops or flaps of the sacks, and deliver the same to a travelling drying table.

The several devices above enumerated are co-operatively arranged for action in proper sequence and each thereof involves highly important novel features, as will hereinafter more fully appear in the description of the commercial machine illustrated in the accompanying drawings.

The present flour trade demands small sacks containing from two to five pounds of flour, but of course the size and capacity of the sacks may be varied beyond these limits and they may contain various materials other than flour. Sacks for containing such small quantities of flour or the like are almost universally made of tough fibrous paper.

For the purpose of packing, shipping and display, it is very desirable that the filled and sealed sacks be approximately rectangular in horizontal section. Sacks that are of the intucked type are best adapted to be given such rectangular formation when filled and sealed.

A commercial machine which meets all of the above indicated requirements and others is illustrated in the accompanying drawings wherein like characters indicate like parts throughout the several views.

Referring to the drawings:

Fig. 1 is a perspective showing the complete machine adapted to receive the filled sacks from the packer, not shown, and to deliver the closed sacks to an endless travelling rack;

Fig. 2 is a perspective on a larger scale than Fig. 1, and with some parts broken away or shown in part, illustrating chiefly the creasing, folding and sealing devices, looking at the same from the front side of the machine;

Fig. 3 is a perspective showing chiefly the parts illustrated in Fig. 2, looking at the same from the rear side of the machine;

Fig. 4 is a plan view, with some parts removed, showing the receiving end of the machine, to wit: the package or sack former, the shaking feed belt, and co-operating parts;

Fig. 5 is a plan view with some parts broken away and some parts removed showing that portion of the machine that is located between the receiving section illustrated in Fig. 4, and the rotary-receiving rack; Figs. 4 and 5, to make a complete view, should be put together on the lines x—x of said two figures;

Fig. 6 is a vertical section taken on the line 6—6 of Fig. 4;

Fig. 7 is a plan view showing parts below the line 7—7 of Fig. 6;

Fig. 8 is a view supplemental to Fig. 7, the parts illustrated being separated on the line marked y—y on said two figures;

Fig. 9 is a vertical section taken on the line 9—9 of Fig. 5, some parts being removed and some parts being broken away;

Fig. 10 is a transverse section taken on the line 10—10 of Fig. 5;

Fig. 11 is a transverse section taken on the line 11—11 of Fig. 4;

Fig. 12 is a transverse section taken on the line 12—12 of Fig. 7;

Fig. 13 is a transverse section taken on the line 13—13 of Fig. 8;

Fig. 14 is a transverse section taken on the line 14—14 of Fig. 7;

Fig. 15 is a view in transverse section taken on the line 15—15 of Fig. 8;

Fig. 16 is a transverse section taken on the line 16—16 of Fig. 8;

Fig. 17 is a plan view showing substantially the same parts that are illustrated in perspective in Fig. 2;

Fig. 18 is a group of diagrammatic sections indicated progressively by the letters A, B, C, D, E, F, G, H and I, and which sections illustrate progressions in the bag-folding action that take place at positions indicated by broken lines marked by the corresponding letters on Fig. 17;

Fig. 19 is a transverse vertical section taken approximately on the line marked 19—19 on Fig. 2, some parts being shown in full and showing the bag-creaser and its actuating device;

Fig. 20 is a fragmentary section taken on the same line as Fig. 19 and illustrating the action of the creasing blade and die;

Fig. 21 is a view partly in section approximately on the line 21—21 of Fig. 2, and partly in elevation showing parts forward of said line;

Fig. 22 is a view partly in perspective and partly in wiring diagram illustrating the automatic controller for the creaser-actuating device;

Fig. 23 is a detail in plan showing means for adjusting the action of the star wheel of the creaser controller;

Fig. 24 is a diagrammatic view illustrating the timed action of the star wheel and the creaser controller;

Fig. 25 is a section taken on the line 25—25 of Fig. 17;

Fig. 26 is an elevation showing in detail the glue fountain and distributor of the sealing mechanism; and which parts are immediately forward of the line 26—26 marked on Fig. 17;

Fig. 27 is a section through the glue fountain of the sealing mechanism taken on the line 27—27 of Fig. 17;

Fig. 28 is a detail chiefly in section on the line 28—28 of Fig. 27, but with some parts broken away;

Fig. 29 is a detail in section on the line 29—29 of Fig. 17, showing the vertically movable support for the sealing mechanism;

Fig. 30 is a view of the rotary receiving rack and its driving mechanism, some parts being removed;

Fig. 31 is chiefly in elevation of the parts shown in Fig. 30, but with some parts sectioned on the line 31—31 of Fig. 30;

Fig. 32 is a section taken on the line 32—32 of Fig. 31;

Fig. 33 is a section taken on the line 33—33 of Fig. 31;

Fig. 34 is a perspective showing the sack partly closed and in condition for delivery to the creaser and folding mechanism; and Fig. 35 is a section taken through the partially folded flap of the sack on the line 35—35 of Fig. 25, looking upward.

Attention is first directed particularly to sheets containing Figs. 1, 2, 4, 5, and 17. A filled paper sack a will be delivered to receiving portion of the machine preferably from the delivery belt 36 of an automatic packer, the construction of which is well known to those familiar with the trade. The receiving portions of the machine are mounted on a long horizontally disposed deck 37 that is suitably supported by pedestals 38. The bag-feeding mechanism of the machine illustrated, is made up of two groups of co-operating belts which may be treated as primary and secondary feed devices. The primary feed device includes an endless deck belt 39 and a pair of horizontally spaced side belts 40. The deck belt 39 is mounted to run over rollers or pulleys 41 carried on shafts 42 mounted in suitable bearings on the bottom of the deck 39, and which deck is provided with belt passages that permit the upper portion of the deck belt 39 to run over the upper surface of the deck between the spaced belts 40.

The side belts 40 are arranged to run over pulleys 43 loosely journaled on upright shafts 44, see Figs. 11 and 14, that are anchored to the deck 37 at their lower ends and, as shown, are tied together at their upper ends by cross-bars 45. Rigidly secured to the receiving portion of the deck 37 and projecting beyond the same, just above the plane of said deck, are outwardly diverging aligning or arighting arms 46 that perform an important function to be hereinafter described.

The inner runs of the side belts 40 pass against or close to upright side boards 47 that are rigidly secured to the deck 37 by suitable means, as shown, by angle brackets 48 that are secured for lateral adjustments on said deck to somewhat vary the spacing of said side boards. The inner faces of the side boards 47 against which the inner rungs of the belts 40 travel, are cut back at intervals so as to afford longitudinally spaced intermediate belt-engaging abutments 47ᵃ that perform important functions, as will fully appear in the description of the operation.

The operative portions of the belts 39 and 40 travel in a forwardly direction, to wit: from right toward the left in respect to Figs. 1, 2, 4, 6 and 7. That portion of the deck 37 that is illustrated in Figs. 4, 6 and 7 are long slots 49 through which are arranged to work horizontally disposed shaker rails 50 that are engageable with the under side of the upper portion of the belt 39 to vibrate the same. These rails 50 are carried by the upper ends of the crank heads 51 that are mounted on a longitudinally extended crank shaft 52, the crank-acting ends of which are journaled in bearings 53 fixed to and depending from the deck 37. The crank heads 51 are held for approximately vertical movements by links 51ᵃ pivoted thereto and to a depending flange of the deck 37 as best shown in Fig. 12.

When the bags are carried by the deck belt 39 to or beyond the ends of the side boards 47, they are carried between laterally spaced rails 54 fixed on the intermediate portion of the deck 37 and are delivered onto a fixed bag-supporting surface 55, which may be treated as a worktable. When the bags reach or are in the vicinity of the table 55, the free top portion of the bag will be in-tucked substantially as shown in Fig. 34, either by hand or otherwise, the former operation being the one performed in the present machine. From the table 55, the in-tucked bags are delivered to a crimping device which gives an initial form to the fold of the bag. This crimper may be operated in various different ways, but the device illustrated comprises a pneumatic actuator that has an automatic electrical controller. The crimper proper, see Figs. 2, 18, 19, and 20, comprises a relatively fixed crimper head or jaws 56 and a co-operating movable crimper head or jaw 57. The head 57 is rigidly secured to parallel plungers 58 that work through the fixed head 56 and are secured to a cross-head 59. Head 56 is shown as rigidly secured to a pedestal 60, which latter at its lower end is rigidly secured to the deck structure 37, see also Fig. 21. Fixed head 56 has a deep-cut notch 61 and a projecting blade 62, and movable head 57 is provided with a groove 63 that is aligned with the blade 62. Coiled compression springs 64 react against the heads 56 and 57 and normally hold the latter away from the former, as best shown in Fig. 19. The head 56 is formed with a cylinder 65 within which is a piston 66, the projecting stem of which is connected to the cross-head 59. The crimper heads 56 and 57, see particularly Figs. 2 and 17, are provided with rearwardly diverging guide arms 56ᵃ and 57ᵃ that guide the in-tucked flap of the bag properly between said heads and between the blade 62 and groove 63.

As indicated, the crimper here illustrated is directly actuated by compressed air. The structure provided for this operation includes an air delivery pipe 67 that leads to the inner end of cylinder 65 and the receiving end of which is connected by a port 68, see Fig. 19, to an air passage 69 formed in the valve casing 70. This air passage 69 is also connected to an exhaust port 71. Air is supplied from a suitable source of compressed air through a pipe 72 that opens into an enlargement 69ᵃ of air passage 69 and in which is a coiled spring 73 that normally holds a two-way valve 74 in position to connect the inner end of cylinder 65 to discharge port 71.

The controller for this pneumatic actuator is an electro-magnetic device. Hence, in this arrangement, the valve 74 is subject to the core 75 of a solenoid 76, which latter, as shown, is contained in a casing 77 which, as well as the valve casing 74, is rigidly supported by suitable means such as a projection 60ª of the pedestal structure 60. In the structure illustrated in Fig. 19, the core 57 can be manually depressed at will so as to cause an operation of the crimper by means of a push button 78 mounted in the top of the casing 77.

As the bag passes to the crimping device above described, it engages one of the arms of a sort of star wheel, which because of its action, is herein designated as a turnstile 79. This turnstile, see particularly Figs. 5, 19 and 22, has four projecting arms secured to a hub portion journaled on a stud or pin 80 secured on the deck 37 in such position that the arms of said turnstile move into the path of travel of the bag through approximately ninety degrees of rotation. On the hub of this turnstile is a cam flange 81 formed with four cam quadrants so that the camming actions correspond to the number of arms of said turnstile. This cam 81 is rigidly secured to the hub of the turnstile with freedom for limited circumferential adjustments to vary its timing action, as shown, by means of slot and screw connections 82, shown in Fig. 23. The cam quadrants 81 act upon one end of an intermediately pivoted lever 83 intermediately pivoted to a bracket 84 secured on the deck. A pronged end of lever 83 engages a pin 85 of a two-tube mercury switch 86—86ª, the frame of which is shown as journaled to a supporting bracket 87, see Fig. 22.

The wiring of the controller for the pneumatic crimp actuator, as indicated in Fig. 22, includes a supply circuit 88 and a shunt or branch circuit 89. Circuit 88 includes the above noted core 75, solenoid 76, mercury bulb or switch element 86 and switch 90. Branch circuit 89 includes the mercury bulb 86ª and a solenoid 91 diagrammatically shown in Fig. 22. The movable element of the switch 90 will be yieldingly held in closed position shown in Fig. 22, but solenoid 91 is so located that when energized, it will open said switch 90 by action on a pneumatic element of said switch. It will now be noted that in the position of the controller switch, mercury bulb 86 is in a circuit-closing position and mercury bulb 86ª is in a circuit-opening position. The numeral 92 shows a master switch interposed in the main circuit 88 and which switch must be closed when the controller is to be rendered operative.

Working over the intermediate portion of the deck 37 and between laterally spaced side or guide boards 93 and 93ª see particularly Figs. 4, 5, and 6, is an intermediate platform belt 39ª that runs over pulleys 41ª carried by shafts 42ª journaled in suitable bearings on the under side of the deck 37. This belt 39ª will deliver the sacks to the table 55 and will start the same between the diverging ends of the guide rails 54. From the crimper, the sacks are delivered to secondary feed mechanism and to the bag-folding devices. Of the parts of the secondary feed mechanism, the numeral 94 indicates a deck belt, the upper run of which passes through and works over the rear portion of the deck 37. The numeral 95 indicates side belts, the inner runs of which are spaced along the edges of the belt 94. Belt 94 runs over pulleys 96 and 97 secured to shafts 96ª and 97ª, respectively, journaled in suitable bearings on the under portion of the deck. The side belts 95 run over pulleys or rollers 98 and 99 secured on upright shafts 98ª and 99ª, journaled in suitable bearings on the deck. The receiving portion of the belt 94 extends far beyond the rollers 98 so as to receive the sacks directly from the table 55. As best shown in Figs. 6 and 7, small idle guide rolls 100 are journaled to the deck in the space between the belts 39 and 39ª; and similar idle guide rolls 101 journaled in the said deck just beyond the delivery portion of the belt 94. As the crimped fold of the sack passes from the crimper, it immediately enters between the diverging receiving ends of a pair of twisted or slightly spiral cam-acting folder bars 102 and 103. Bar 102, at its receiving end, is hung by a hinge 104 from a long arm 105 rigidly secured to the pedestal 60 and extended parallel to the line of feed.

The free rear end of cam bar 102 is secured to a floating shelf or plate 106, see particularly Figs. 9, 17, 28 and 29, the upper turned edge of which is hinged to a guide plate 107 mounted for vertical movements on a projection of the arm 105. The floating shelf 106, as will hereinafter appear, affords a support that carries the glue fountain of a gluing or sealing device. The spiral cam bar 103 is shorter than the bar 102 and at its forward portion is rigidly connected to the latter by a yoke 108, as best shown in Figs. 3 and 17. The cross-sectional forms of the twisted or spiral cam-acting bars 102 and 103, at different points in their cross-section, is best indicated in Fig. 18. By reference to the progressive sections of said Fig. 18, it will be noted that the bar 102 varies in its cross-section progressively from the nearly flat form shown in section A, to the V-shaped formation shown in cross-sections E, F and G. Also, it will be noted that the cross-sections of the bar 103 progressively follow the upper flap or flange of bar 102 so that the flap of the sack is first given a first fold upon itself and then the folded part is further doubled so that a double or second fold will be nearly but not completed at the delivery end of bar 102.

For engagement with the back of the top portion of the sack while its flap is being folded, there is provided a pair of approximately parallel coping plates or bars 109 and 110, the former of which engages the back of the top of the sack and the latter of which engages the top of the sack under the flap thereof, while it is being folded. Coping plate 109, as shown, is rigidly supported from the arm 105 by means of a bracket 111, and the coping plate 110 is shown as supported from the said arm by a bracket 112, see particularly Figs. 2 and 18.

The sealing device, which applies the glue to the folded flap of the bag, preferably comprises a glue pot 113, which, as shown, is rectangular in horizontal section and is mounted on the floating shelf 106, to which, it will be remembered, the cross-section of the V-shaped free end of the folder bar 102 is attached or secured. It is now of the utmost importance to note that the glue pot or receptacle 113 has a shoe-like portion 113ª that is aligned with and attached to the delivery end of the bar 102 in such manner that it forms practically a continuation thereof that will ride directly under the nearly completed fold or flap of the bag. Glue may be supplied to the glue pot in various different ways, but since it is highly important that a constant level of the glue therein be maintained, such supply is made from an inverted glue-containing bottle 114 held in an inverted position by a rack 115, see particularly Figs. 21 and 28, with the neck of the bottle seated through a vertically adjustable collar 116 that opens through the top of the glue pot. The shoe portion 113 of the glue pot projects slightly forward of the body wall thereof and in its top wall is provided with a small opening through which works the upper portion of the glue-distributing roller 117 that is carried by a shaft 118 journaled in fixed bearings on the front side of the glue pot 113. Obviously, the upper portion of the glue-applying roller 117 is exposed for direct contact with the under side of the folded flap of the bag, see particularly Figs. 25 and 26. A stop 107a on slide 107, see Fig. 9, limits the downward movement thereof and hence the downward movements of the rear end of cam bar 102 and the gluing device. From the foregoing, it is evident that the cam-acting bars perform a complete and continuous folding of the flattened open end of the sack. At their receiving ends, said cam bars have such maximum divergence that they are adapted to receive the flattened but unfolded or turned over mouth or open end of the sack. The angle of divergence of these bars progressively decreases through positions that first give a primary or initial turn-over or fold to the mouth of the sack and then give a second or double turn-over to the folded mouth of the sack, and finally deliver the double-folded end of the sack directly to the gluing device through a channel that is approximately V-shaped and has but slight divergence so that the nearly closed end of the sack will be delivered directly over the upwardly opening discharge passage of the glue pot. Note particularly the different sections of Fig. 18.

Working immediately over the glue-applying roller 117, but never quite in contact therewith is a knurled wheel 119 that is carried by the end of a shaft 120 that is journaled in a small frame 121 which, in turn, is pivoted to a flange of the glue pot at 122. Shaft 120 is provided with a small spur gear 123 that meshes with a small pinion 124 carried by shaft 118 so that roller 117 will be rotated at relatively high speed by friction produced on the wheel 119 by the flap compressed between the same and the glue-applying roller under the action of gravity and a light coiled spring 125 that connects frame 121 to the flange or side of the glue pot.

From the glue-applying device just described, the folded flap of the sack is brought directly under and is tightly pressed down by a presser plate 126, shown as rigidly secured to the arm 105 by a bracket 127, see particularly Figs. 2, 3 and 17, and section I, Fig. 18.

From the glue-applying device and presser plate 126, the sacks are, by the belts 94 and 95, delivered to travelling drying rack or rotary drying table, which involves highly important novel features both in the structure and operation.

This drying rack as shown comprises an annular table 127, which, by arms 128, is connected to a hub 129, see particularly Figs. 1, 2, and 30 to 33, inclusive, that is rotatably mounted on the upwardly projecting trunnion of a central standard 130. The table 127 at its inner edge has an upstanding annular bag-stop flange 131. Inasmuch as the table will carry a considerable load of bags, it is arranged to run over auxiliary supports afforded by circumferentially spaced columns 132 provided at their upper ends with anti-friction rolls 133. It is now important to note, see particularly Figs. 5 and 32, that the roller 99 for the relatively short belt 95 is located above the table 127 so as to insure the delivery of sacks onto said table. Said roller is shown as thus supported by being journaled to a flat projecting portion 37a at the delivery end of the deck 37. Here it should also be noted that the inner or operative portions of the two side belts 95 run against side boards 134, see particularly Figs. 5 and 17, which, as shown, are rigidly but adjustably secured to the delivery end portion of the deck 37 by means of slotted angle brackets 135 and machine screws 136 or the like.

Working vertically through the table 127 radially inward of the stop flange 131 are quite closely positioned circumferentially spaced plungers 137. At their upper ends, plungers 137 are provided with rigidly but adjustably secured bag-clamping heads or caps 138 having flat under surfaces. These clamping heads are preferably made as segments of a complete circle so that they come in close engagement and together make up a complete sectional annular clamp for the bags.

Vertical adjustments of said clamping plates adapt them for action on bags of different height. At their lower ends, plungers 137 are shown as provided with forked heads equipped with anti-friction rolls 139 mounted on journal pins 140, the ends of which project and afford cam-acting trunnions, as will hereinafter appear, see particularly Figs. 31, 32 and 33. As shown, the plungers 137 work vertically through guide sleeves 141 rigidly secured to the table 127. Coiled springs 142 on the lower portions of said plungers are compressed between the forked heads thereof and the sleeves 141 and exert force yieldingly forcing said plungers and their clamping heads downward. As shown in Figs. 32 and 33, vertical movements of the plungers are limited by stop collars 143 rigidly secured on said plungers with freedom for vertical adjustments. Rotation of the plungers is prevented, as shown, by means of guide pins 144 that project inward from the sleeves 141 and engage longitudinal slots 145 in the said plungers.

Throughout substantially ninety degrees of travel of the drying rack, the rollers 138 of the plungers run over a segmental cam rail or track 146. This cam rail is shown as supported by posts 147 and brackets 147a, which latter, as shown, are made vertically adjustable on said posts, by nut-equipped bolts 147b or the like. The drying table will be rotated in a counter-clockwise direction in respect to Figs. 1, 2, and 30, so that the said rollers travel from the left toward the right in respect to Fig. 31. Throughout something less than one-half of its length from left toward the right, the upper surface of the cam rail 146 is preferably on a level, but its receiving end is beveled at 146a. The stop collars 143 on the plungers 137 will be so set that the rollers will pass onto the beveled surface 146a, regardless of whether or not the sacks are still clamped to the table. Approximately the right-hand half of said cam rail 146, as viewed in Fig. 31, is on a decline.

Spaced immediately above and substantially parallel to the upper surface of the right-hand portion of the cam rail 146, are parallel spiral cam rails 148 that are angular in cross-section, and as shown, are pivotally supported at 148a and rigidly but adjustably secured to vertical supporting legs 149, which in turn, by slots and bolt connections 150, see Fig. 33, are rigidly but adjustably secured to said brackets 147a.

It sometimes is desirable to interrupt the movement of the sacks to the crimper and hence there is provided a manually-operated device shown in Figs. 1 and 5. This device comprises a stop blade 151 that is pivoted to one of the side boards 93 at 152 and is provided with an outwardly projecting arm 153 which, by a spring 154 is normally held in an inoperative position as shown in Fig. 5. For moving the stop blade 151 into the back runway when desired to interrupt the feed movement, there is shown a cable 155 that runs over a pulley 156 on the back side of the deck 37 and, as shown in Fig. 1, is connected to a foot treadle 157.

The various running parts of the machine above described may be driven in various different ways. The power-supplying and driving means illustrated for the several devices, briefly described, are as follows: An electric motor 158, see particularly Figs. 1, 7 and 12, drives a belt 159 that runs over a pulley 160 on a countershaft 161 journaled in bearing brackets 162 depending from the deck 37. Shaft 161 carries a sprocket 163 that drives a chain 164 that runs over an idle sprocket 165 and over a relatively small sprocket 166, which latter is secured on the crank shaft 52 so that the shaker rails 50 will be rapidly vibrated. Shaft 161 extends forward as far as shown in Fig. 8, and is provided with a worm 167 that engages a worm gear 168, see Figs. 8 and 15, on a transverse countershaft 169, which, at its opposite end, is provided with a sprocket 170. Sprocket chain 171 runs over the sprocket 170 and over a sprocket 172 on the front roller shaft 42ª, see Figs. 7 and 8, thus serving to drive the intermediate deck belt 39ª.

Shaft 169 carries a sprocket 173. A sprocket chain 174 runs over the sprocket 173 and over a sprocket 175 on a transverse countershaft 176, see Figs. 6, 7, 10 and 14, journaled in bearing sprockets 178 on the bottom of the deck 37. Shaft 176 drives front rollers 43 and hence the side belts 40 through mitre gears 179.

The belts 94 and 95 are driven from a small electric motor 180, see Figs. 2, 5, 9 and 10, the rotor of which drives a worm 181 that meshes with a worm gear 182 on shaft 97ª of pulley 97. Shaft 97ª at one end, carries a sprocket 183. A sprocket chain 184 runs over sprocket 183 and over a sprocket 185, see particularly Figs. 2 and 10, on one end of a transverse countershaft 186 journaled in suitable bearings on the bottom of the deck 37. Shaft 186 drives the pulleys 98 through mitre gears 187.

The rotary drying rack is driven from a small electric motor 188 through suitable reducing mechanism which, as shown, comprises as follows: The rotor shaft 189 of said motor carries a worm 190 that engages a worm gear 191. Shaft 192 carries a worm 193 that meshes with a worm gear 194, the hub of which carries a sprocket 195. The heretofore noted hub 129 of the rotary drying rack is provided with sprocket teeth 196, over which and the sprocket 195 runs a sprocket chain 197. By the driving connections just described, the rotary drying rack will be rotated at a slow rate of speed in a counter-clockwise direction in respect to Fig. 30. The above noted driving connections 190 to 195, inclusive, are shown as contained in a housing 198 mounted on a suitable pedestal 199.

The various parts of the machine have already been described, and many of the functions and operations have been indicated. The progressive co-operative actions, the order and timing of the operations and certain highly important functions not already made definite, will appear in the following general description of the operation of the machine.

From the statements made in the introductory description, it was made clear that it is highly desirable that the filled and sealed paper bag should be as nearly as possible rectangular in formation. However, the filled sacks, as they come from the packer, are very far from being of such rectangular form and, in fact, more closely approach cylindrical form. These filled bags, as they are placed on the packer belt 36, will not always stand with their major transverse axis aligned with the line of feed. Nevertheless, just before the sacks are delivered to the deck belt 39 and side belts 40, they will be engaged first by one and then by both of the diverging arighting arms 46 and will be turned into the position shown at their right in Fig. 4, and thus properly started between said rollers 40.

By the belts 39 and 40, the filled sacks will be fed forward. The side boards 47 and the inner forwardly moving portions of the belts 40 are so arranged that they converge slightly in the direction of the travel of the sacks, thus causing the filled sacks to be flattened progressively as they move forward. The belt-engaging abutments 47, in the direction of the feed, are also progressively spaced closer and closer together so that the sacks, in passing between the same and between the delivery ends of the boards 47 will be intermittently and positively pressed progressively closer and closer together.

While the sacks are being carried on the deck belt 39, the latter will be rapidly vibrated vertically, so that the flour in the sacks will be settled and packed. The effect of the vibrating action on the sacks will be greatest while they are travelling between the clear or cut-back spaces of the boards 47. Thus the sacks are alternately pressed laterally into slightly narrower formation by the abutments and are quite violently shaken at points or periods between the effective vertical vibrations. In fact, when the sacks pass the cut-back spaces of the boards 47, they can expand slightly against the belts 40 but will be again compressed laterally in passing between the next abutments. In the structure shown, the delivery ends of the boards 47 also act as abutments. From the actions described, the flour will be thoroughly settled and properly packed in the sacks, and the body of the flour in the sacks will be made uniform, assuming, of course, that the same amount of flour will have been deposited in each sack by the packer.

From the belts 39 and 40, the sacks will be delivered over the idle rolls 100, onto the belt 39ª and between the side boards 93 and 93ª, and by said belt 39ª will be carried between the rails 54 and onto the table 55. While the sacks are on or in the vicinity of the table 55, the flap or upper portion of the sack by hand or otherwise, will be in-tucked, as shown in Fig. 34 and directed between the blade 62 and groove 63 of the crimper heads or jaws 56 and 57, as best shown in Fig. 19. By reference to this view, Fig. 19, it will be observed that the edge of the fixed blade 62 projects toward the left or outward beyond the axis or central vertical line of the sack. This feature is important and necessary as the initial step in producing a smooth fold that will form a flat top of the sack.

When the sack is being fed between the jaws of the crimper as just stated, it engages one of the arms of the turnstile or arm-equipped member of the controller and starts to rotate the same. When the point of lever 83 reaches about the middle portion of the segmental cam on said member 79, see Fig. 24, arm 83 will be oscillated far enough to oscillate the mercury bulbs 86 and 86ª to positions in which the circuit will be broken through bulb 86 and closed through bulb 86ª. The operation of mercury bulbs just noted, acting through circuits illustrated in Fig. 32, and previously described, will cause solenoid 76 to be energized, thereby moving valve 74 to a position to close exhaust port 71 and to admit the compressed air through port 68 and pipe 67 to the cylinder 65. When air is thus admitted to said cylinder, piston 66 will be moved and head or jaw 57 will be instantly forced toward head 56, thereby tightly pinching the flap of the sack as shown in Fig. 20. The above described movement will be a sort of striking action which will not cut through the paper of the sack, but will rupture the fibers and produce a definite crimp or folding line therein. The crimping of the sack above described will be produced almost with an instantaneous action, for as soon as the particular cam surface of the controller passes from under the end of the arm 83, the bulbs 86 and 86ª, by the action of gravity or otherwise, will be instantly restored to their normal positions shown in Fig. 22. The exact timing in the actions just noted, may be varied somewhat by adjustments of the cam-acting member 81 in respect to the turnstile 79, permitted by the slot and screw connections 82, shown in Fig. 23.

From the crimper, the crimped flap of the sack is fed directly between the slightly spiral cam-acting folder bars 102 and 103. The progressive folding action whereby the double fold of the flap of the sack is produced, is indicated in the various sections of Fig. 18 and has already been fully described as has also the manner in which the nearly completed double fold of the sack is delivered by a continuous action over the shoe 113ª and roller 117 and under the knurled wheel 119 of the glue-applying device, and it will be remembered how the glue is thoroughly and with certainty applied to the under side of the double fold. Also it will be remembered that the flap, as it passes from the shoe of the glue pot, passes immediately under the presser plate 126. This presser plate not only holds down the flap of the sack and presses the same against the top of the sack, but tends to flatten out the major portion of the top of the sack.

In view of the hinge connection at 104 and the mounting of the guide plate 107 for vertical movements, it is obvious that the delivery end of the cam-acting folder bars and the glue-applying mechanism are free for slight but common vertical movements so as to adapt themselves to any slight irregularities in the partially folded top of the sacks.

In the previous description, it has been made clear how the belts 95 will deliver the sacks directly onto the annular table 127 of the travelling drying rack. The important arrangement and operation of the drying rack will now be further considered. When the rollers of the plungers 137 are on the horizontal portion of the rail 146, the clamping heads 138 will be raised above the tops of the sacks, as best shown in Fig. 31, but also in the empty gap of the sack shown in Fig. 1. These heads will be held raised until the sacks have been delivered onto the table 127 and under the raised heads. Then as the rack revolves in the counter-clockwise direction stated, the pivot pins 140 will be carried under the flanges of the upper rails 148 and under the continued movement of the rack in the direction stated, said rails 140 will gradually draw down the said clamping heads onto the tops of the sacks and will positively compress and give flat form to the top of the sacks. These downward movements of the clamping heads will be quite gradual and at no time will any one of the clamping heads be much below the other so that it makes no difference whether a sack is delivered entirely under one clamping head or partly under two adjacent clamping heads. Moreover, the pressure of the heads is applied to the tops of the sacks not with a sudden movement, but gradually and positively, but the clamping movement will begin very quickly after the sack has been properly positioned on the table. After the tops of the sacks have been put under the proper compression and given their flat form, it will take but slight pressure to maintain the sacks in that form while the glue of their flaps is being thoroughly set.

During the time that the clamping heads are being drawn down by the rails 148, the inclined delivery portion, to wit: the right-hand portion of the lower rail 146, as viewed in Fig. 31, holds back the springs 142 and prevents the same from becoming active to force down the plungers and the clamping heads. When the rollers run off from the lower end of said rail 146, said springs, which are released gradually and one after the other, will then become active to hold down the clamping heads with sufficient pressure to maintain the flat formation and closely folded action of the top of the sacks. The pressure, however, will not be so great but that the sacks may be quite easily removed manually. However, the positive release of the sacks from the heads will take place immediately after the plunger rollers run up on the inclined ends 146ª of rail 146, and hence the easiest place to remove the sacks with the glue of their flaps completely dried, will be at the open or sackless gap shown in Figs. 1 and 31. The stop collars 143 on the plungers 137 prevent springs 142 from imparting to the sacks any but slight downward movement of the plungers and clamping heads and, of course, said stops limit the downward movement of the plungers so that their rollers will engage on the inclined end 146ª of the rail 146.

What we claim is:

1. In a machine of the kind described, means for folding the flaps of filled sacks, comprising a pair of slightly spiral or twisted cam-acting folding bars that progressively decrease their angle of divergence from a position to receive the flattened but unfolded open end of a sack, through positions that, by a continuous action, first fold and then double-fold the flattened end of the sack, and a glue-applying device at the extremity of one of said cam bars arranged to apply the glue to the folded flap of the sack, said folding bars being yieldingly mounted for vertical movements to adjust themselves to the folding of the flap.

2. In a machine of the kind described, means for folding the flaps of filled sacks, comprising a pair of slightly spiral or twisted cam-acting folding bars that progressively decrease their angle of divergence from a position to receive the flattened but unfolded open end of a sack, through positions that, by a continuous action, first fold and then double-fold the flattened end of the sack, and a glue-applying device at the extremity of one of said cam bars arranged to apply the glue to the folded flap of the sack, said gluing device involving a glue pot having a shoe forming an extension of the last noted cam bar and having an upwardly opening glue discharge passage for application to the under side of the folded flap.

3. In a machine of the kind described, means for folding the flaps of filled sacks, comprising a pair of slightly spiral or twisted cam-acting folding bars arranged to progressively fold the flaps of the sacks, and a glue-applying device at the extremity of one of said cam bars arranged to apply the glue to the folded flap of the sack, one of said cam bars being longer than the other and terminating at its delivery end portion that is V-shaped in cross-section, and said glue-applying device having a shoe forming an extension of the lower flange of the V-shaped portion of said V-shaped cam bar and having the glue discharge orifice opening upward for application of glue to the under side of the folded flap of the sack.

4. In a machine of the kind described, means for folding the flaps of filled sacks comprising a pair of slightly spiral or twisted cam-acting folding bars that progressively decrease their angle of divergence from a position to receive the flattened but unfolded open end of a sack, through positions that, by a continuous action, first fold and then double-fold the flattened end of the sack, one of which bars is longer than the other, and in cross-section is angular with an increasing fold in its angularity so that at its delivery end it is V-shaped in cross-section, said folding bars being yieldingly mounted for vertical movements to adjust themselves to the folding of the flap.

5. In a machine of the kind described, means for folding the flaps of filled sacks comprising a pair of slightly spiral or twisted cam-acting folding bars, one of which is longer than the other, and in cross-section is angular with an increasing fold in its angularity so that at its delivery end it is V-shaped in cross-section, and a gluing device comprising a pot having a shoe aligned with the lower flange of the V-shaped delivery end of said long bar, said shoe having in its top an opening for the discharge of glue upward against the folded flap.

6. In a machine of the kind described, means for folding the flaps of filled sacks comprising a pair of slightly spiral or twisted cam-acting folding bars, one of which is longer than the other, and in cross-section is angular with an increasing fold in its angularity so that at its delivery end it is V-shaped in cross-section, and a gluing device comprising a pot having a shoe aligned with the lower flange of the V-shaped delivery end of said long bar, said shoe having in its top an opening for the discharge of glue upward against the folded flap, said gluing device further comprising a glue-distributing roller working in the discharge orifice of said shoe, a pressure wheel arranged to engage the upper portion of the folded flap of the sack, and connections whereby said glue-applying roller will be driven from said pressure wheel.

7. The structure defined in claim 6 in which said pressure wheel is mounted for movement toward and from said shoe and is yieldingly pressed toward the same.

8. The structure defined in claim 6 in which the delivery end of the long bar of said folding means and the shoe of said gluing device are interconnected and mounted for slight but common vertical movements.

9. The structure defined in claim 4 in further combination with coping plates spaced to clear the projecting flap of the sack, one thereof being arranged to engage the top of the sack below said cam-acting folding bars and the other being angular in cross-section and engageable with the opposite portion of the side and top of the sack to assist in holding the tops of the sacks in form while their flaps are being folded.

10. The structure defined in claim 5 in further combination with a power-driven deck belt and power-driven laterally spaced side belts arranged to feed the sacks between said cam-acting folding bars and to and past said gluing device.

11. The structure defined in claim 6 in further combination with a power-driven deck belt and laterally spaced power-driven side belts arranged to feed the sacks between said cam-acting folding bars and to and past said gluing device.

12. A bag flap crimper comprising normally separated jaws, one having a crimper blade and the other a co-operating crimping channel, power means for causing said crimper blade to press the flap of the sack into said crimping channel, means for feeding the sacks to said crimper, and a controller for actuating said power means including a rotary member of the turnstile type, the arms of which are arranged to project into the path of movement of the sacks and under the movement of the sacks to actuate said crimper while the flap of the sack is properly positioned between said crimping blade and channel.

13. The structure defined in claim 12 in which said power means includes a cylinder in one of the jaws, a piston in said cylinder connected to the other jaw for moving the same, and a compressed air supply connection to said cylinder including a controlling valve actuated by said controller.

14. Means for feeding filled bags comprising a power-driven deck belt, co-operating laterally spaced side belts, and longitudinally spaced fixed abutments engaging the backs of the inner portions of said side belts to put pressure upon the bags at different points along the line of their travel, said abutments in the direction of travel of the bags being spaced progressively closer and closer together.

15. Means for feeding filled bags comprising a power-driven deck belt, co-operating laterally spaced power-driven side belts, and laterally spaced side boards engageable with the backs of the inner portions of said side belts and having longitudinally spaced bag-compressing abutments operative on said side belts to intermittently compress the filled bags, the inner portions of said side belts and the abutments on said side boards being spaced progressively closer and closer together in the direction of the travel of the bags.

16. The structure defined in claim 15 in further combination with a deck underlying the operative upper portion of said deck belt, and a power-driven shaker rail working through said deck and engageable with the operative upper portion of said deck belt to vibrate the sacks.

17. A bag-drying rack comprising an endless rotary horizontally disposed table, circumferentially spaced vertically disposed plungers working through said table, clamping heads on the upper portions of said plungers, said plungers having depending ends, and a segmental rail located under the path of movement of the lower ends of said plungers and operative thereon to raise said plungers and clamping heads throughout a portion of the travel thereof and to release said plungers for engagement of said heads with the underlying sacks, in combination with automatic means operative to deliver filled sacks to said rack in timed relation in respect to the raised plungers.

18. A bag-drying rack comprising a travelling horizontally disposed endless table and thereon vertically disposed depressible bag-clamping heads in closely spaced relation, means for raising said heads during a part of their travel to admit bags thereunder, means for depressing said heads onto the bags, and means for retarding and causing said heads to gradually and progressively lower onto the bags positioned thereunder, in combination with means for folding the flaps of the filled bags, means for thereafter applying glue to the folded flaps, and means for thereafter delivering the same to said drying rack under the raised heads thereof.

19. The structure defined in claim 18 in combination with means for varying the extent to which said clamping heads will be depressed.

20. A bag-drying rack comprising a horizontal rotary circular table, cirumferentially spaced plungers working vertically through said table, bag-clamping heads applied to the upper portions of said plungers, said plungers having depending lower ends, a segmental rail located in the path of movement of said plungers and operative thereon to raise the same and said clamping heads through a portion of travel thereof and to gradually and progressively release said plungers for engagement with said clamping heads with the underlying sacks, in combination with automatic means operative to deliver filled sacks to said rack in timed relation in respect to the raised plungers.

21. A bag-drying rack comprising a horizontal rotary circular table, circumferentially spaced plungers working vertically through said table, bag-clamping heads applied to the upper portions of said plungers, said plungers having depending lower ends, a segmental rail located in the path of movement of said plungers and operative thereon to raise the same and said clamping heads through a portion of travel thereof and to gradually and progressively release said plungers for engagement with said clamping heads with the underlying sacks, and springs operative on said plungers to yieldingly hold the heads pressed against the sacks until said plungers are again engaged with said rail.

22. A bag-drying rack comprising a horizontal rotary circular table, circumferentially spaced plungers working vertically through said table, bag-clamping heads applied to the upper portions of said plungers, said plungers having depending lower ends, a segmental rail located in the path of movement of said plungers and operative thereon to raise the same and said clamping heads through a portion of travel thereof and to gradually and progressively release said plungers for engagement with said clamping heads with the underlying sacks, and an inclined rail operative on said plungers to positively draw the same down and hold said clamping heads tightly pressed against the sacks while said plungers are being gradually permitted to lower by the delivery portion of said first-noted rail, in combination with automatic means operative to deliver filled sacks to said rack in timed relation in respect to the raised plungers.

23. The structure defined in claim 22 in which said last noted rail is adjustable to vary its angle of inclination and hence the extent to which said clamping heads will be forced against the sacks.

24. A bag-drying rack comprising a horizontal rotary circular table, circumferentially spaced plungers working vertically through said table, bag-clamping heads applied to the upper portions of said plungers, said plungers having depending lower ends, a segmental rail having a receiving end inclined in a direction reverse to the direction of rotation of said table, and having a gradually inclined delivery portion operative to gradually release said plungers and clamping heads for lowering action onto the bags, in combination with automatic means operative to deliver filled sacks to said rack in timed relation in respect to the raised plungers.

25. The structure defined in claim 24 in further combination with an inclined rail operative on said plungers while they are travelling on the inclined delivery portion of said first noted rail and operative to positively depress said plungers and heads.

26. A bag-drying rack comprising a horizontal rotary circular table, circumferentially spaced plungers working vertically through said table, bag-clamping heads applied to the upper portions of said plungers, said plungers having lower ends equipped with rollers and with lateral pin-like projections, a segmental rail located in the path of movement of said rollers and operative thereon to raise said plungers and clamping heads through a portion of the travel thereof, and laterally spaced segmental upper rails engageable with said pin-like projections to gradually but positively depress said plungers and clamping heads.

27. The structure defined in claim 26 in which said first noted rail is provided with an inclined plunger-releasing portion co-operating with said second noted rails to produce a gradual application of pressure on said sacks.

28. The structure defined in claim 26 in which said first noted rail is provided with an inclined plunger-releasing portion co-operating with said second noted rails to produce a gradual application of pressure on said sacks, the delivery end portion of said second noted rails being vertically adjustable, and springs applied to said plungers and exerting yielding downward pressure thereon, said plungers further having stops limiting their extreme downward movement.

29. In a machine of the kind described, a crimping device, a folding device and a gluing device, arranged for action in the order named, said gluing device and the delivery portion of said folding device being inter-connected and arranged for slight but common vertical movements to adjust themselves to the sack, and means for feeding filled sacks so as to carry their flaps to said crimping device, from thence to said folding device and from thence to and past said gluing device.

30. A bag flap crimper comprising normally separated jaws, one having a crimping blade and the other having a co-operating crimping channel, power means for causing said crimper blade to press the flap of the sack into said crimping channel, and a controller for actuating said power means including a member arranged to project into the path of movement of the sacks to the crimping position, and to actuate said crimper when the flap of the sack is positioned between said blade and co-operating channel, said power means including a cylinder in one of the jaws, a piston in said cylinder connected to the other jaw for moving the same, and a compressed air supply connection to said cylinder including a controlling valve actuated by said controller.

31. Means for feeding filled bags comprising a power-driven deck belt, co-operating laterally spaced side belts and longitudinally spaced abutments engaging the backs of the inner portions of said side belts to put pressure upon the bags at different points along the line of travel, in further combination with a deck underlying the operative upper portion of said deck belt, and a power-driven shaker rail working through said deck and engageable with the operative upper portion of said deck belt to vibrate the same.

32. Means for feeding filled bags comprising a power-driven deck belt, co-operating laterally spaced side belts and longitudinally spaced abutments engaging the backs of the inner portions of said side belts to put pressure upon the bags at different points along the line of travel, in further combination with a conveyor belt delivering to said deck, and fixed diverging arms projecting beyond said deck belt toward said feeding means and operative to center and align the sacks properly between said side belts.

33. In a machine of the kind described, means for folding the flaps of filled sacks, said folding means adapted to move vertically to adapt itself to the folded flap, and a glue-applying device at the delivery end of said folding means mounted to rise and fall with the movable part of said first noted means and arranged to receive and directly seal the folded flap.

34. In a machine of the kind described, means for folding the flaps of filled sacks, said folding means adapted to move vertically to adapt itself to the folded flap, and a glue-applying device at the delivery end of said folding means mounted to rise and fall with the movable part of said first noted means and arranged to receive and directly seal the folded flap, in further combination with an approximately horizontally disposed plate arranged immediately beyond said glue-applying device and under which the closed and glued flap of the sack is arranged to be directly pressed.

35. The structure defined in claim 34 in further combination with a movable drying table having depressible clamping heads arranged to receive the sacks with folded and glued flaps directly on said table and under the aligned and raised head of said table, said table structure involving means for automatically lowering the raised heads on the underlying sacks.

36. A bag-drying rack comprising a travelling horizontally disposed endless table having thereon vertically disposed depressible bag-clamping heads in closely spaced relation combined with means for raising said heads during a certain part of their travel to admit bags thereunder and for depressing said heads onto the bags positioned thereunder, in combination with cooperating bag-feeding belts arranged to deliver the bags successively under the raised clamping heads.

37. A bag-drying rack comprising a travelling horizontally disposed endless table having thereon vertically disposed depressible bag-clamping heads in closely spaced relation combined with means for raising said heads during a certain part of their travel to admit bags thereunder and for depressing said heads onto the bags positioned thereunder, in combination with co-operating bag-feeding belts arranged to deliver the bags successively under the raised clamping heads, and in further combination with means for folding the flaps of the bag and applying glue thereto just prior to their delivery to said rack.

38. A bag-drying rack comprising an endless rotary horizontally disposed table, circumferentially spaced vertically disposed plungers working through said table, clamping heads on the upper portions of said plungers, said plungers having depending ends, and a segmental rail located under the path of movement of the lower ends of said plungers and operative thereon to raise said plungers and clamping heads throughout a portion of the travel thereof and to release said plungers for engagement of said heads with the underlying sacks, in combination with means for delivering sacks under the raised head and means for folding the flaps of the sacks and applying glue thereto just prior to their delivery onto the table of said rack and under the raised heads thereof.

39. A bag-drying rack comprising a horizontal rotary circular table, circumferentially spaced plungers working vertically through said table, bag-clamping heads applied to the upper portions of said plungers, said plungers having depending lower ends, a segmental rail having a receiving end inclined in a direction reverse to the direction of rotation of said table, and having a gradually inclined delivery portion operative to gradually release said plungers and clamping heads for lowering action onto the bags, in combination with an inclined rail operative on said plungers while they are travelling on the inclined delivery portion of said first noted rail and operative to positively depress said plungers and head, and springs acting on said plungers and serving to yieldingly clamp said head onto the bags when not subject to the action of said rails.

40. A bag-drying rack comprising a horizontal rotary circular table, circumferentially spaced plungers working vertically through said table, bag-clamping heads applied to the upper portions of said plungers, said plungers having depending lower ends, a segmental rail having a receiving end inclined in a direction reverse to the direction of rotation of said table, and having a gradually inclined delivery portion operative to gradually release said plungers and clamping heads for lowering action onto the bags, in combination with an inclined rail operative on said plungers while they are travelling on the inclined delivery portion of said first noted rail and operative to positively depress said plungers and heads, springs acting on said plungers and serving to yieldingly clamp said heads onto the bags when not subject to the action of said rails, and stops on said plungers limiting the downward movements thereof.

41. In a machine of the kind described, means for folding container flaps comprising cam-acting folder bars spaced one above the other, and a glue receptacle having a projecting neck that is aligned and forms a continuation of the lower folder bar at the delivery end of the latter, said neck having an upwardly opening glue discharge passage, in combination with means for feeding the containers with their flaps between said folder bars and from thence over the upwardly opening discharge passage of said neck.

42. The structure defined in claim 41 in further combination with means immediately beyond the neck of said glue pot for holding the flaps tightly pressed together until the glue has set thereon.

ROY N. PIERSON.
CHARLES H. CARLSON.